(12) United States Patent
Marut

(10) Patent No.: US 9,144,912 B2
(45) Date of Patent: Sep. 29, 2015

(54) SHAVING APPARATUS

(71) Applicant: Brett Marut, Miami Beach, FL (US)

(72) Inventor: Brett Marut, Miami Beach, FL (US)

( * ) Notice: Subject to any disclaimer, the term of this patent is extended or adjusted under 35 U.S.C. 154(b) by 114 days.

(21) Appl. No.: 14/044,426

(22) Filed: Oct. 2, 2013

(65) Prior Publication Data

US 2015/0089814 A1    Apr. 2, 2015

(51) Int. Cl.
*B26B 19/38* (2006.01)
*B26B 19/06* (2006.01)
*F16C 11/10* (2006.01)
*F16C 11/00* (2006.01)

(52) U.S. Cl.
CPC .............. *B26B 19/06* (2013.01); *B26B 19/386* (2013.01); *B26B 19/3853* (2013.01); *F16C 11/00* (2013.01); *F16C 11/10* (2013.01)

(58) Field of Classification Search
CPC .... B26B 19/06; B26B 19/3853; B26B 19/386
USPC ............ 30/43.7, 43.8, 43.9, 43.91, 43.92, 42, 30/44, 526, 527, 531; 403/91–93, 96, 97
See application file for complete search history.

(56) References Cited

U.S. PATENT DOCUMENTS

| | | | | |
|---|---|---|---|---|
| 5,123,768 A * | 6/1992 | Franklin | ........................... | 403/96 |
| 5,520,474 A * | 5/1996 | Liu | ................................. | 403/97 |
| 5,765,958 A * | 6/1998 | Lan | ................................ | 403/97 |
| 6,189,222 B1 * | 2/2001 | Doyle | ............................. | 30/531 |
| 6,565,156 B1 * | 5/2003 | Yamashita et al. | ........ | 297/354.12 |
| 7,103,980 B2 * | 9/2006 | Leventhal | ........................ | 30/526 |
| 7,270,129 B1 * | 9/2007 | Rehkemper | .................... | 132/322 |
| 7,617,569 B2 * | 11/2009 | Liao | ................................ | 16/334 |
| 7,856,725 B2 * | 12/2010 | Marut | ............................. | 30/527 |
| 8,132,978 B2 * | 3/2012 | Franklin et al. | ................. | 403/96 |
| 2011/0225826 A1 * | 9/2011 | Leventhal | ...................... | 30/34.1 |

* cited by examiner

*Primary Examiner* — Ned Landrum
*Assistant Examiner* — Richard Crosby, Jr.
(74) *Attorney, Agent, or Firm* — Raymond Sun

(57) ABSTRACT

A shaver includes an improved locking mechanism for securing a shaving head to the shaver while allowing for simple and convenient removal thereof. The shaver further includes an adjustable shaver head that effectively follows the contours of the face or body. The shaver can be extended to use with a backshaver that has a first handle portion connected to a second handle portion by a joint assembly that allows the handle portions to be adjusted to varying angles and locked at a desired angle.

3 Claims, 12 Drawing Sheets

SHAVING APPARATUS

BACKGROUND OF THE INVENTION

1. Field of the Invention

The present invention relates to shaving apparatus, and in particular, to improvements in shaving components that are used with shavers.

2. Description of the Related Art

The market has seen many new shavers that are directed to shaving different parts of the body. Face shavers have long been popular, and now shavers designed for use in shaving a user's leg and back have also become popular.

The advent of these new types of shavers also brings with them different needs and requirements.

For example, backshavers are used to shave a user's back, so the user must be able to reach the desired locations in the back.

In addition, the shaver head must adapt to the contours of the user's face or back.

Also, depending on the part of the body on which the shaver is being used, the shaver head may need to be changed, and shaver heads need to removed for cleaning or replacement. As a result, convenience in changing and locking new shaver heads have also become important.

Thus, there remains a need for improved shaving components. Specifically, there is a need for an improved shaver where the shaver head can be conveniently changed and locked in place, and where the shaver head can follow the contours of the user's face or body. In addition, there is a need for a backshaver that provides improved access to all areas of the user's back.

SUMMARY OF THE INVENTION

It is an object of the present invention to provide an improved locking mechanism for securing a shaving head to a shaver while allowing for simple and convenient removal thereof.

It is another object of the present invention to provide a shaver head that follows the contours of the face or body.

It is yet another object of the present invention to provide a backshaver that has a handle that allows the user to reach any desired location in the back.

To accomplish these objectives, the present invention provides, in one embodiment thereof, a shaver having a shaver head and a handle base. The shaver head has a lower end that has a recess, and a circular raised ring extending from the lower end having at least two spaced-apart L-shaped grooves. The handle base has a mounting base that includes a circular groove having at least two spaced-apart bumps provided in a wall of the circular groove, with each of the bumps being fitted inside a corresponding L-shaped groove when the shaver head is connected to the handle base, and the mounting base further including a locking projection that is fitted inside the recess of the shaver head when the shaver head is connected to the handle base The present invention provides, in another embodiment thereof, a shaver head having a head portion and a base portion. The head portion includes a shaving element, with a connection shaft extending from a lower end, the connection shaft having opposing transverse rotating shafts extending therefrom, and opposing baffles adjacent the rotating shafts and extending from the connection shaft. The base portion has a housing, with positioning racks extending in the housing to receive corresponding rotating shafts for rotation therein. The base portion further includes a plurality of springs positioned adjacent the positioning racks, and each spring is aligned with a corresponding baffle so as to be biased against the corresponding baffle for providing a restoring force to the circumferential rotation of the connection shaft.

In yet a further embodiment of the present invention, a backshaver has a first handle portion with a shaver head carried at a first end, a second handle portion, and a joint assembly. The joint assembly has housing that includes a first joint housing connected to the first handle portion and a second joint housing connected to the second handle portion, the first and second joint housings pivotable with respect to each other. A first circle of inner teeth are arranged inside the first joint housing. Two blocks are retained inside the first joint housing, each block having one group of raised teeth that is adapted to be meshed inside certain teeth of the first circle of inner teeth. A biasing element is arranged between the blocks and biases the blocks away from each other to push the groups of raised teeth against the certain teeth of the first circle of inner teeth. A second circle of inner teeth is arranged on an opposite side of the first circle of inner teeth. A raised tooth plate is provided inside the second circle of inner teeth, the raised tooth plate having at least two groups of teeth along its periphery. The raised tooth plate is movable up and down with respect to the second circle of inner teeth to first and second positions, respectively, the at least two groups of teeth of the raised tooth plate being meshed with certain teeth of the second circle of inner teeth in the first position, and the at least two groups of teeth of the raised tooth plate being separated from the teeth of the second circle of inner teeth in the second position. A driving block is secured to the raised tooth plate, and functions to move the raised tooth plate up and down with respect to the second circle of inner teeth.

DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Detachable Shaver Head and Locking Mechanism

Figure 1:
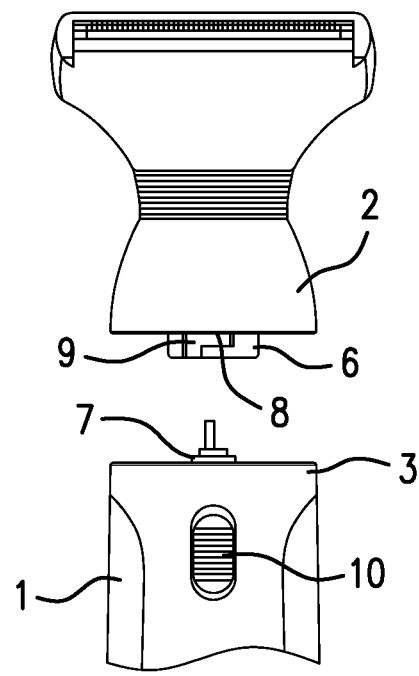
FIG. 1 is an exploded front view of a shaver system showing a removable shaver head and a shaver handle base according to the present invention.
Figure 2:
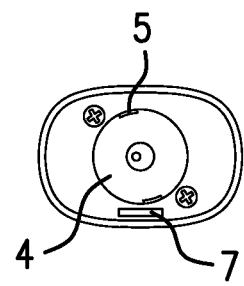
FIG. 2 is a top view of the handle base of FIG. 1.
Figure 3:
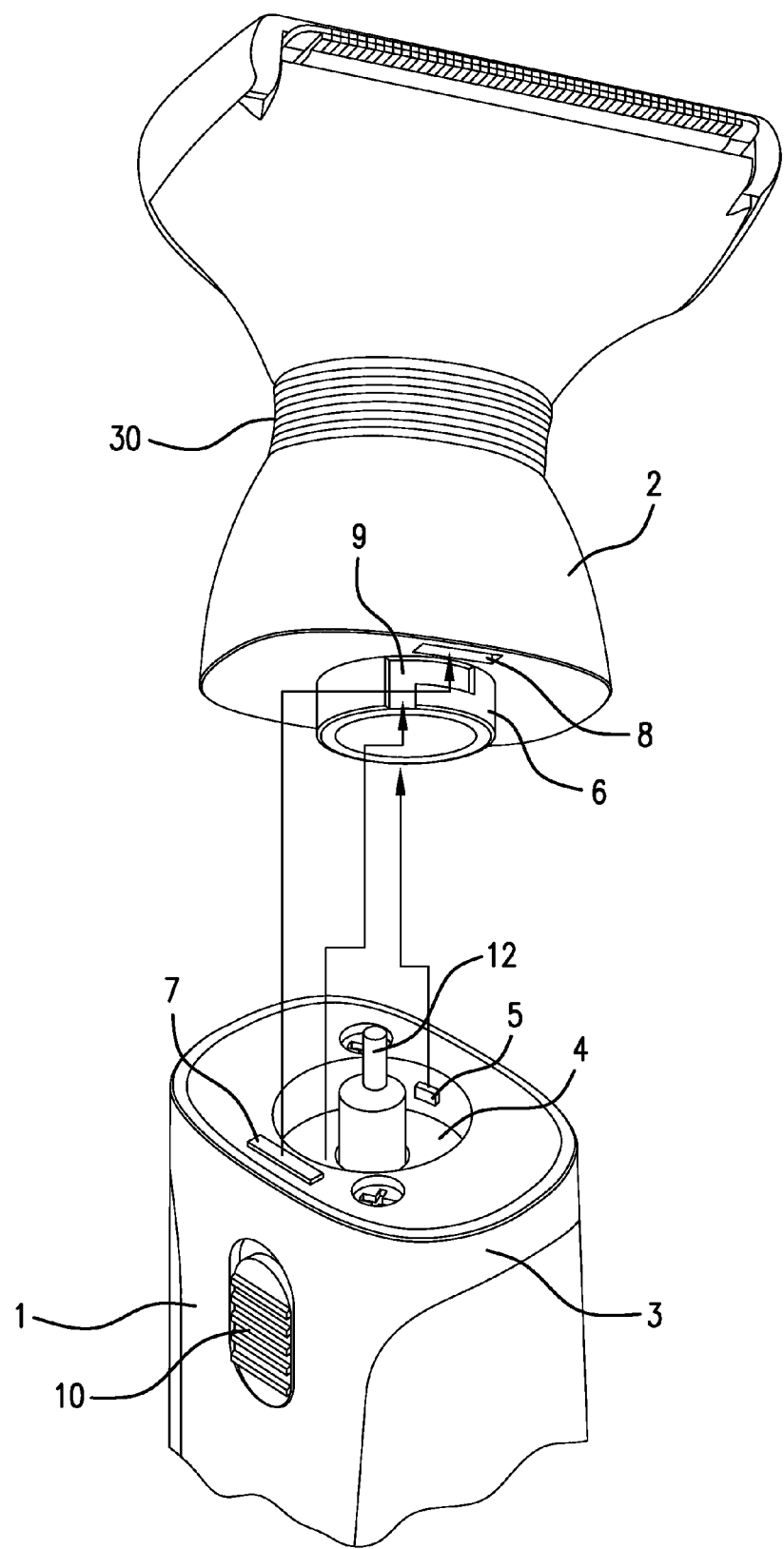
FIG. 3 is an exploded perspective view of the shaver system of FIG. 1.

Referring to FIGS. 1-3, the present invention provides a detachable shaver head 2 with a locking mechanism for locking the shaver head 2 to a handle base 1. The handle base 1 is provided with a mounting base 3 for mounting the shaver head 2. The upper end of the mounting base 3 provides a connection end face between the mounting base 3 and the shaver head 2, and is provided with a circular groove 4 that has a plurality of spaced-apart bumps 5 provided in the sidewall of the groove 4. The lower end of the shaver head 2 is provided with a round raised ring 6 that has a corresponding number of L-shaped grooves 9 provided on its outer side wall. The shaving head 2 is rotatable with respect to the mounting base 3.

A locking projection 7 is arranged on the upper end face of the mounting base 3, and is capable of moving upwardly and downwardly. A sliding switch 10 is provided along the body of the handle base 1 and is connected to the projection 7 and is adapted to move the projection 7 up and down through its sliding motion. The bottom end face of the shaver head 2 is provided with a corresponding locking recess 8 that is aligned to the position of the projection 7.

The shaver head 2 is rotatable with respect to the mounting base 3. To secure the shaver head 2 to the mounting base 3, the shaver head 2 is lowered onto the mounting base 3 so that the raised ring 6 enters the circular groove 4 in a manner such that each bump 5 is aligned with a corresponding L-shaped groove 9 so that each bump 5 enters the short leg of the corresponding L-shaped groove 9. See FIG. 4. The shaver head 2 is then rotated (see FIG. 5) so that the bumps 5 are now moved along the long leg of the corresponding L-shaped grooves 4, locking the shaver head 2 to the mounting base 3. The output shaft 12 of a motor passes through the mounting base 3 to be in transmission connection with the shaver head 2. Next, as shown in FIG. 6, the sliding switch 10 is moved upwardly to cause the projection 7 to be inserted into the locking recess 8 so as to prevent the shaver head 2 from further rotating with respect to the mounting base 3.

Figure 6:
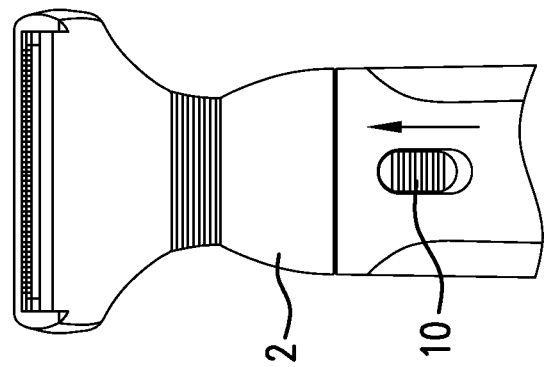
FIGS. 4-6 illustrate how the shaver head of FIG. 1 is locked to the shaver handle base of FIG. 1.
Figure 5:
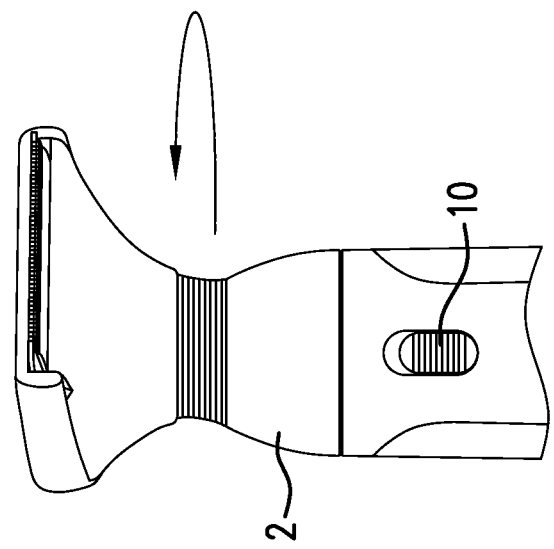
Figure 4:
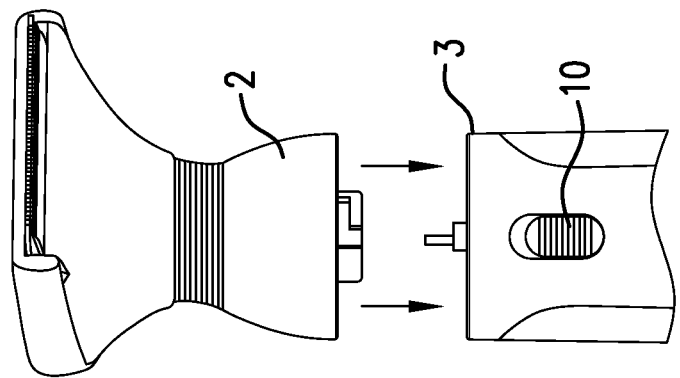

The shaver head 2 can be conveniently and quickly removed by reversing the steps shown in FIGS. 4-6.

The locking mechanism shown and described in FIGS. 1-6 is unique in its function because the shaver shaves in a pulling motion, so the shaver head 2 needs to be maintained in place, and not rotate or twist off while the user is shaving. This is especially important if the shaver head 2 is used in connection with a backshaver, since backshavers often have very long handles, so there is a large amount of torque or force that is paced put on this locking joint between the shaver head 2 and the handle base 1.

Adjustable Shaver Head

The present invention also provides a shaver head 2 that has adjustable-angles on multiple planes. This shaver head is more adaptable to different angles on the surfaces of a human body, and provides a better shaving result.

Figure 7:
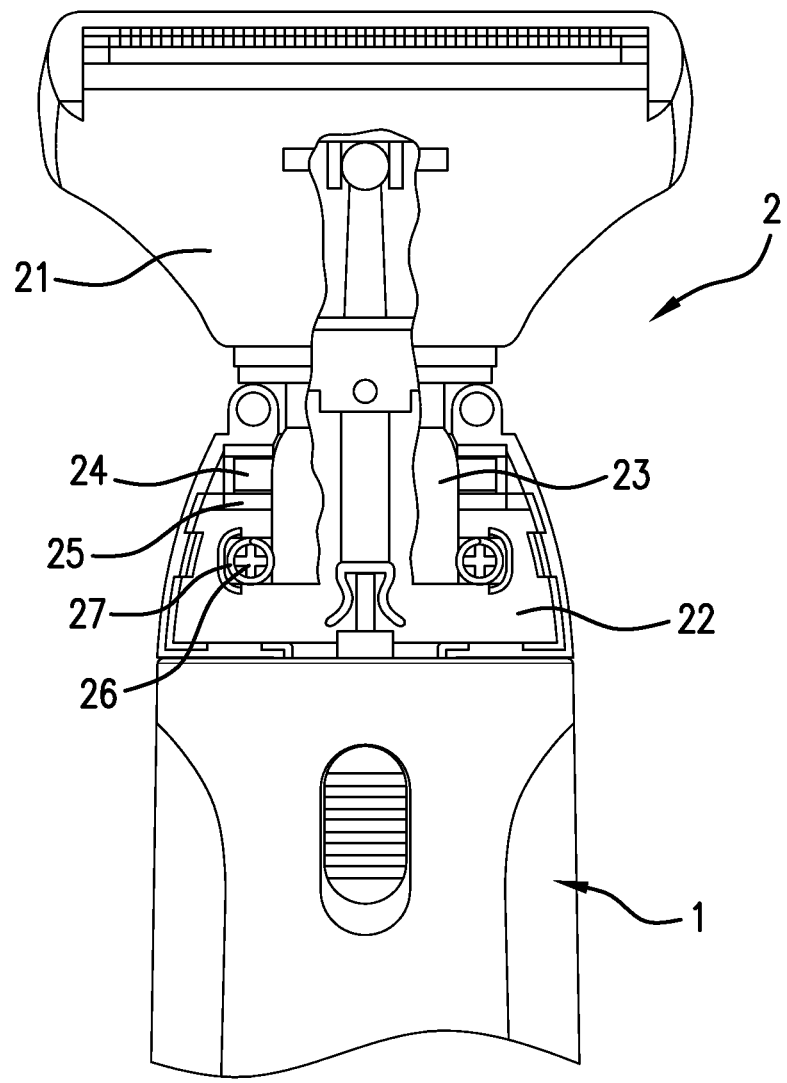
FIG. 7 is a front view of the shaver head of FIG. 1 showing the internal components of the shaver head.
Figure 8:
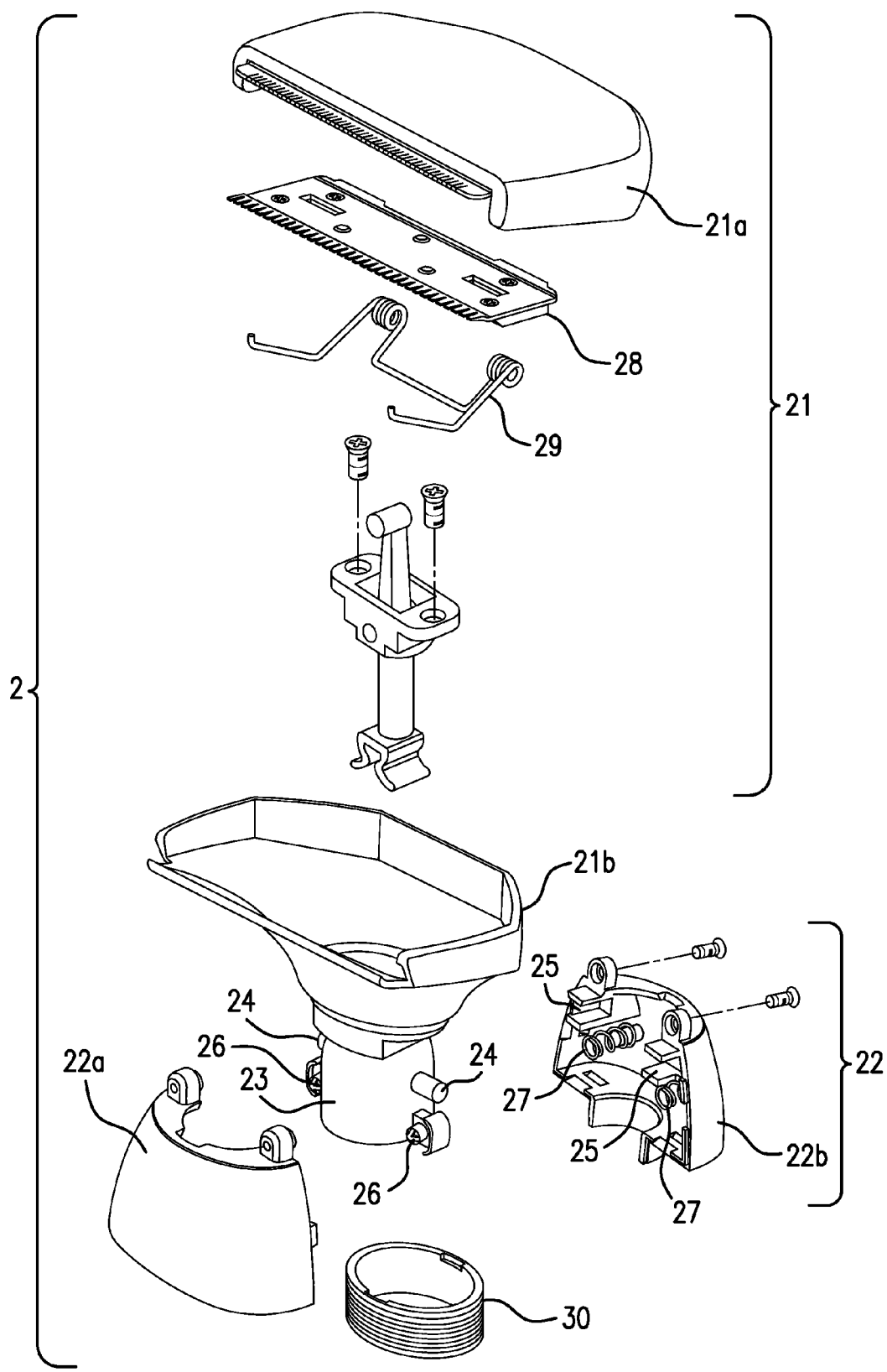
FIG. 8 is an exploded perspective view of the shaver head of FIG. 1.
Figure 9:
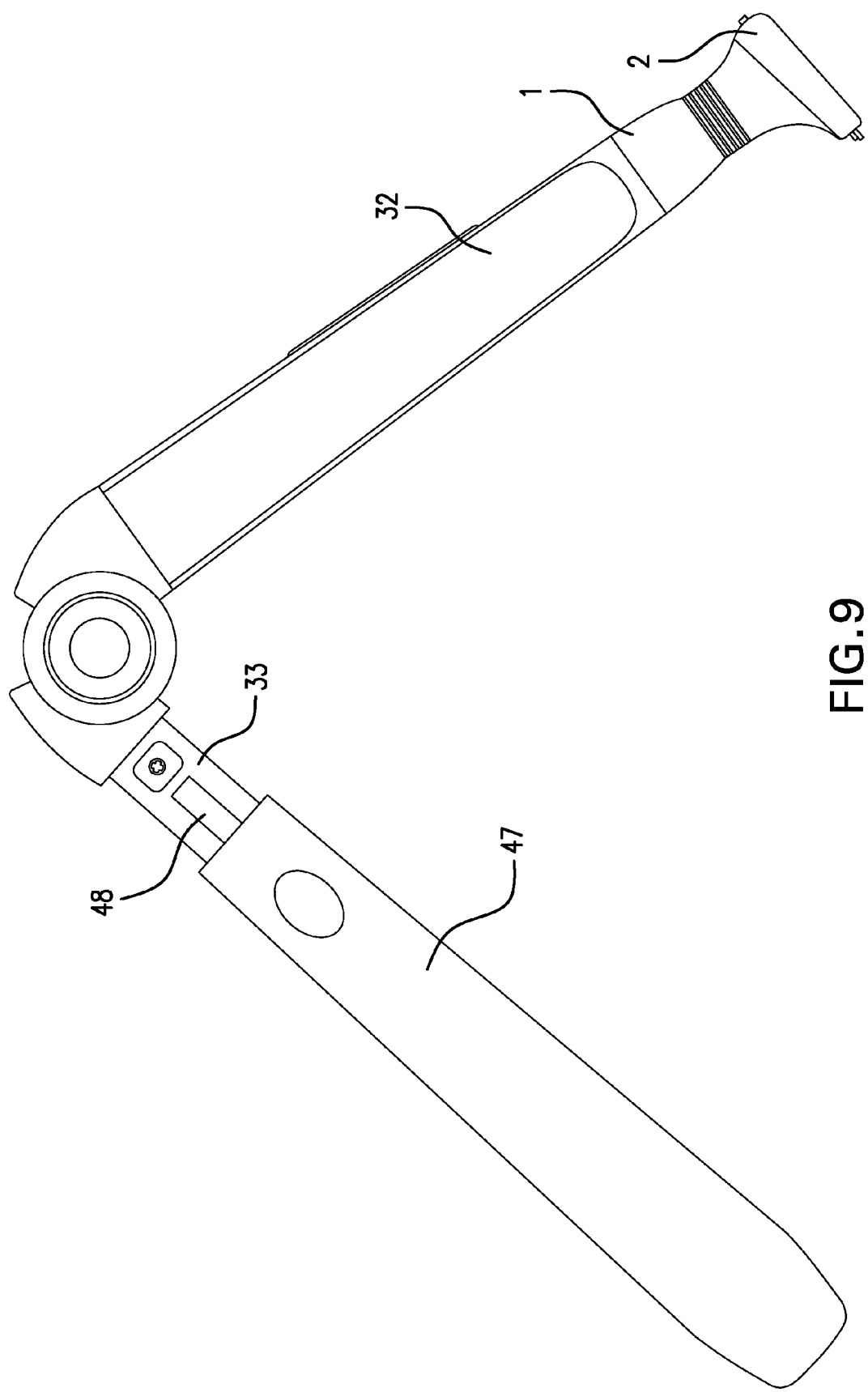
FIG. 9 is a side view of a backshaver according to one embodiment of the present invention.
Figure 10:
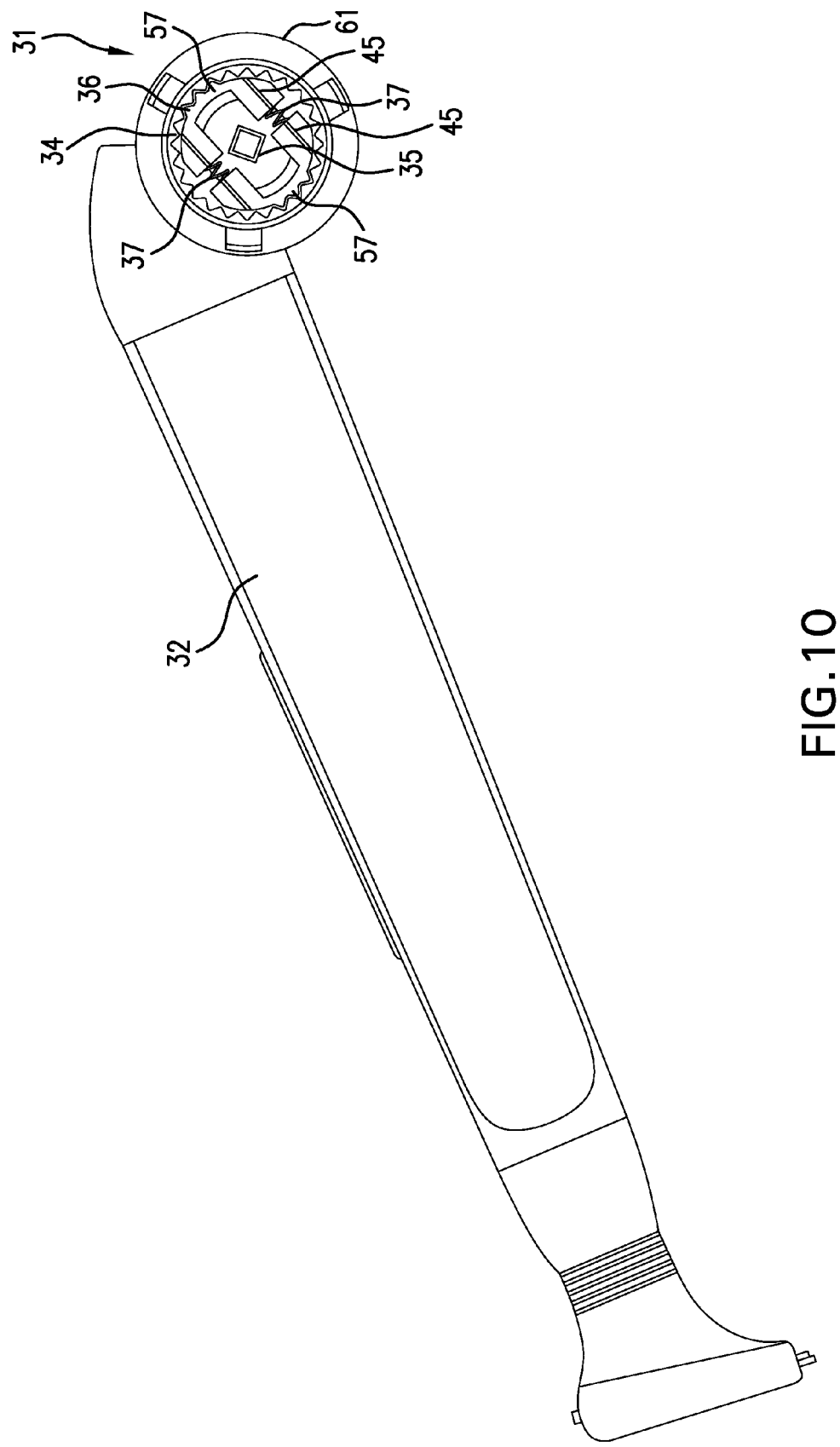
FIG. 10 is a side view of the front face of a first handle portion of the backshaver of FIG. 9 showing the construction of the joint.
Figure 11:
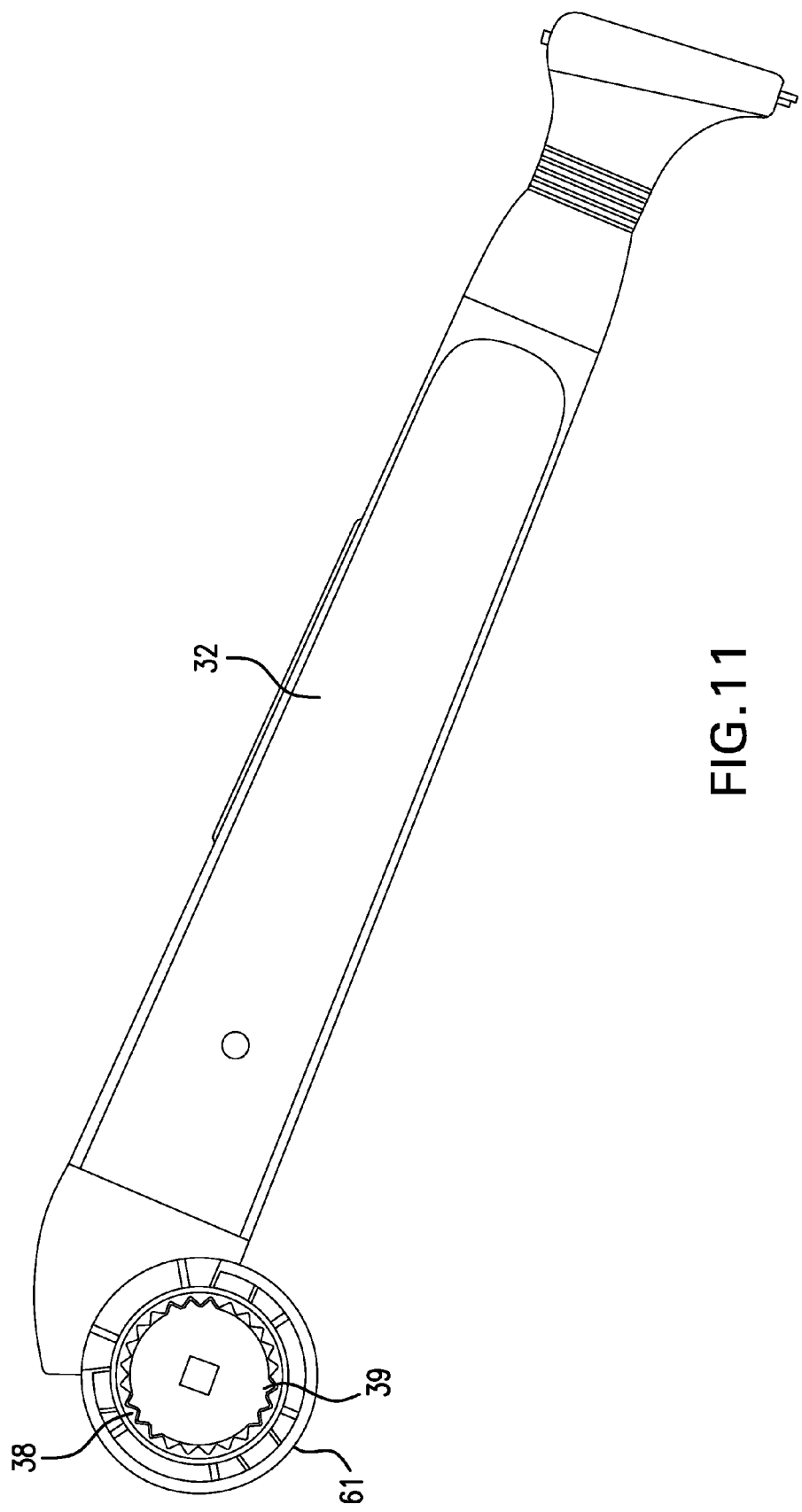
FIG. 11 is a side view of the rear face of a first handle portion of the backshaver of FIG. 9 showing the construction of the joint.
Figure 12:
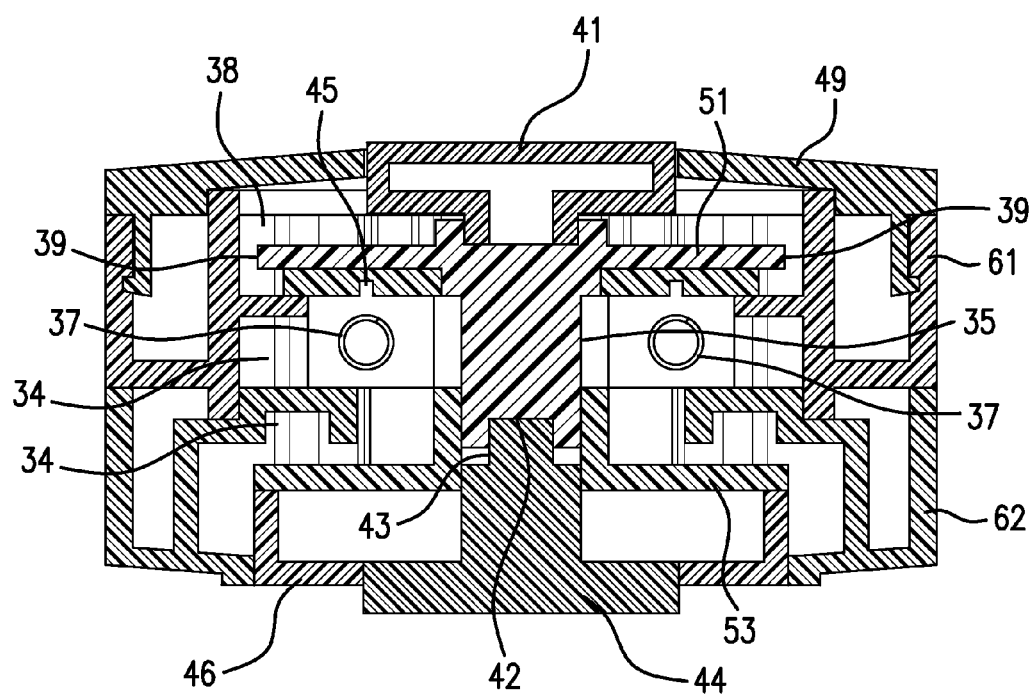
FIG. 12 is a cross-sectional view of the joint of the backshaver of FIG. 9.
Figure 13:
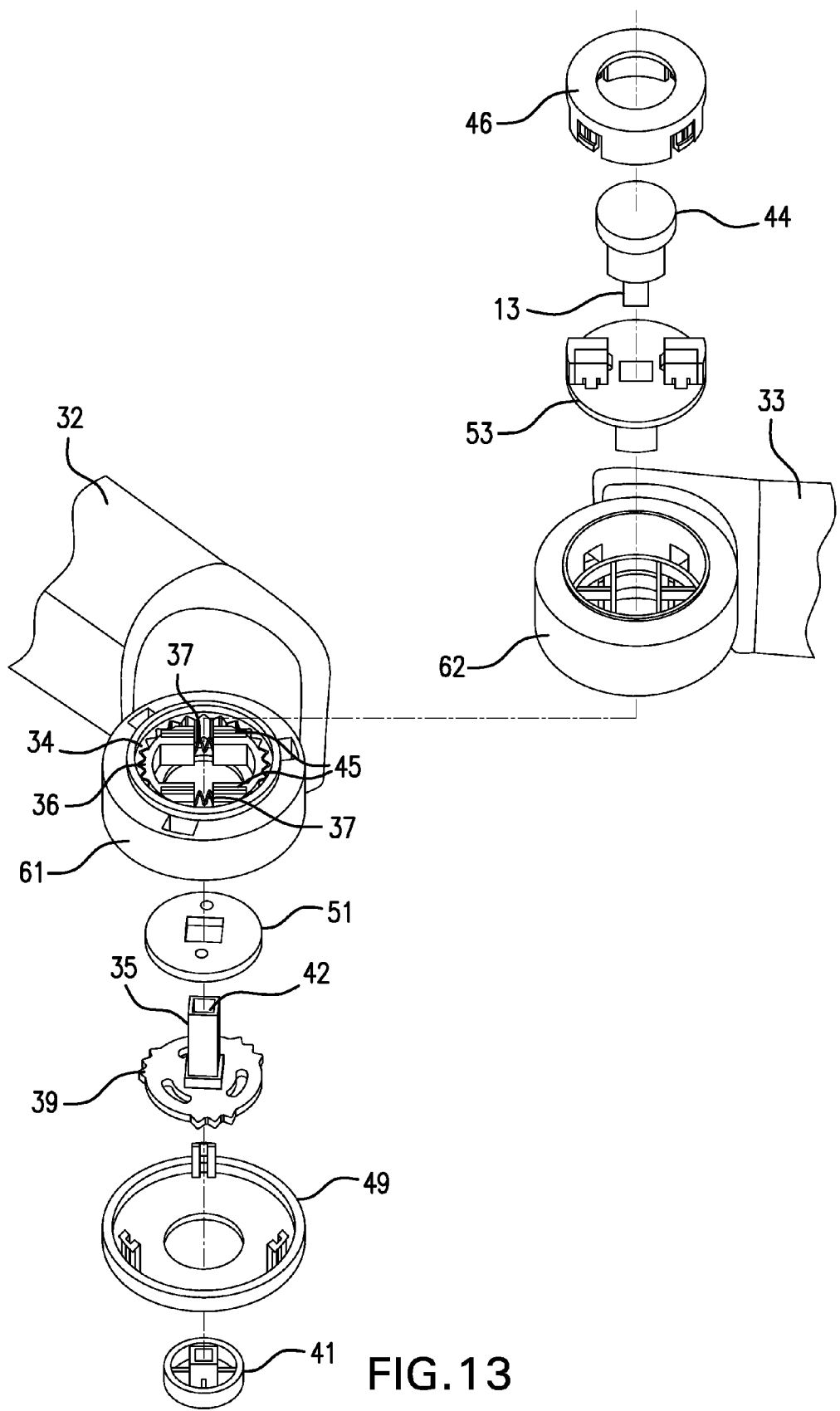
FIG. 13 is an exploded view of the joint of the backshaver of FIG. 9.

The shaver head 2 shown and described above can be provided with the capability of shaving along adjustable-angles on multiple planes. Referring now to FIGS. 7 and 8, the shaver head 2 has a rotating base 22 and a head portion 21. The head portion 21 is formed by two covers 21a and 21b that house conventional shaving components, such as a blade 28 and springs 29, among other components. An elastic band 30 is fitted between the head portion 21 and the rotating base 22.

The rotating base 22 is formed by assembling a front base cover 22a and a rear base cover 22b to form a base housing. The lower end of the head portion 21 is provided with a connection shaft 23 for mounting with the rotating base 22. Left and right transverse rotating shafts 24 extend from opposite sides of the connection shaft 23. Corresponding left and right rotating positioning racks 25 are provided in the rotating base 22 at locations that are aligned with the rotating shafts 24. Left and right baffles 26 are arranged on opposite sides of the connection shaft 23, below the rotating shafts 24. Return springs 27 are positioned in the rotating base 22 below the racks 25, and are aligned with the two baffles 26. The rotating base 22 is provided with four return springs 27, with two return springs 27 positioned in each of the covers 22a and 22b, and aligned so that they form left and right pairs. Each return spring 27 is positioned to be biased against a corresponding baffle 26 for providing a restoring force to the circumferential rotation of the connection shaft 23. The left and right rotating positioning racks 25 are arranged on the left and right portions of the inner side of the base cover 22b, respectively, for rotatably receiving and fixing the corresponding rotating shafts 24.

The connection shaft 23 is cylindrical and capable of rotating on the rotating base 22 along its own circumferential direction. The return springs 27 provide a restoring force to the circumferential rotation of the connection shaft 23 through the baffles 26. The rotating positioning racks 25 and the rotating shafts 24 are provided, with the rotating shafts 24 driving the shaver head 2 to rotate longitudinally about the rotating positioning racks 25. The interactions between these components allow the shaver head 2 to have adjustable-angles on multiple planes, so that this shaver head 2 is more adaptable to different angles on the surfaces of a human body, and provides a better shaving result.

Backshaver with Adjustable Handle

The handle base 1 and the shaver head 2 of FIGS. 1-8 can be used with any type of shaver, but can also be used with a backshaver. FIGS. 9-15B show the use of this shaver 2 and handle base 1 with a backshaver that has a pivoting handle that can be pivoted to different angles, and which has multiple sections to allow the handle to have a varying length.

Referring to FIGS. 9-13, the backshaver has a first handle portion 32 that is pivotably connected to a second handle portion 33 by a joint 31. The shaver head 2 and the handle base 1 are carried on an upper end of the first handle portion 32. A movable handle 47 is sleeved outside the second handle portion 33. A guide rail 48 is provided on the second handle portion 33 in an axial direction, so that the movable handle 47 can move along the guide rail 48.

The joint 31 is illustrated in greater detail in FIGS. 10-15B. The joint 31 allows for the angle between the handle portions 32 and 33 to be adjusted on a lock-step basis to any angle between zero degrees and a maximum angle (e.g., 135 degrees), and then to be retained securely at the selected angle.

The joint 31 includes a first joint housing 61 and a second joint housing 62 that are pivotably secured together to be pivotable with respect to each other. A circle of inner teeth 34 is arranged on a connection face between the first handle portion 32 and a connection end of the second handle portion 33. Two semi-circular blocks 57 are retained inside the first joint housing 61, and each block 57 has one group of raised teeth 36 that encircles a driving block 35. Each group of raised teeth 36 is adapted to be meshed inside the inner teeth 34. Return springs 37 are arranged between the blocks 57 so that the two opposite groups of raised teeth 36 can be rotated with respect to the inner teeth 34. This rotation is accomplished with the blocks 57 pushed against each other against the bias of the return springs 37, so that the groups of raised teeth 36 can be rotated and meshed into different groups of corresponding inner teeth 34.

A circle of inner limiting teeth 38 is arranged on the other surface of the first handle portion 32. A raised tooth plate 39 is provided inside the inner limiting teeth 38 (see FIGS. 14A and 14B), and the raised tooth plate 39 is able to move up and down, so that the raised tooth plate 39 is limited in movement inside the inner limiting teeth 38 to be meshed with the inner limiting teeth 38, or separated from the inner limiting teeth 38 The driving block 35 is secured to the raised tooth plate 39, and the middle part of the driving block 35 is hollow. The raised tooth plate 39 is a generally round panel, and the edge of the raised tooth plate 39 is provided with a tooth profile that is adapted to be fitted with the inner limiting teeth 38.

Figure 14A:
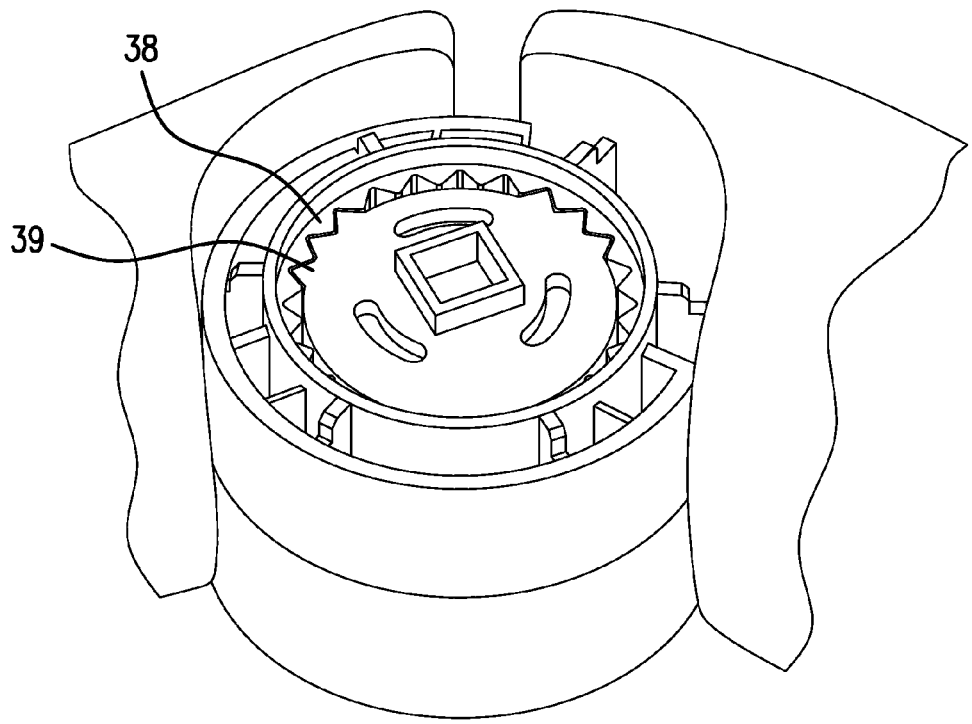
FIGS. 14A and 14B illustrate the relative movement of the raised tooth plate with respect to the inner limiting teeth in the joint of the backshaver of FIG. 9.
Figure 14B:
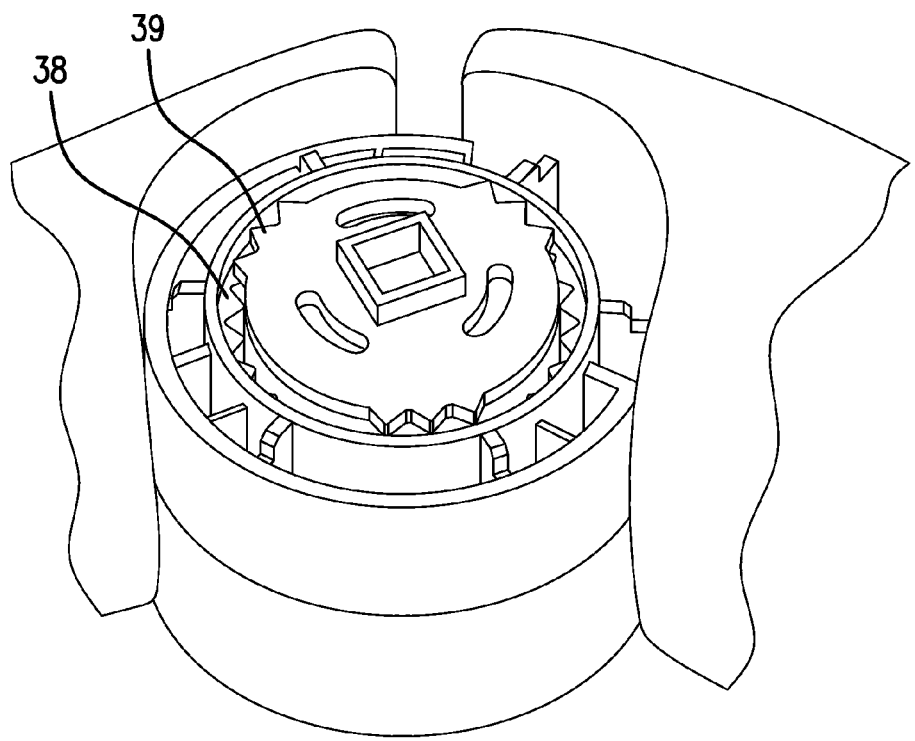

Thus, the raised teeth 36 move along the inner teeth 34 when force is applied to pivot the handle portions 32 and 33. The return springs 37 exert pressure along the raised teeth 36, causing the lock-step turning of the joint 31. This is possible because the teeth on the raised tooth plate 39 are disengaged from the inner limiting teeth 38 (as shown in FIG. 14B).

The outer side face of the first handle portion 32 is provided with an ON switch that comprises a button 41 and a push rod 42. The push rod 42 is positioned inside the hollow part of the driving block 35. The output end of the push rod 42 is connected with an actuating rod 43 which is vertically connected with the raised tooth plate 39. The button 41 drives the raised tooth plate 39 to move up and down through the push rod 42 and the actuating rod 43. An OFF switch 44 is arranged on the outer side face of the second handle portion 33, and the OFF switch 44 is vertically connected to the raised tooth plate 39 to enable the raised tooth plate 39 to move up and down.

Two sets of raised sub-teeth 45 are carried on the blocks 57. The two raised sub-teeth 45 are coupled to each other through the return springs 37, The outer side faces of both raised sub-teeth 45 are provided with tooth profiles that are adapted to be inserted into corresponding slots in the second joint housing 62 (see FIG. 12).

This provides a locking force so that the block 57 remains stationary relative to the second joint housing 62 while the first handle portion 32 and the teeth 34 move around the teeth 36 and the block 57.

A fixing cover 49 is provided outside the ON switch for fixing the button 41 of the ON switch on the outer end face of the driving block 45. Similarly, another cover 46 is provided outside the OFF switch 44 for fixing the switch 44 on the opposite end face of the driving block 35. A retainer piece 53 is provided between the cover 46 and the second joint housing 62, and has a bore which receives a portion of the driving block 35 and the switch 44, so as to align and retain the switch 44 within the joint 31.

A washer 51 is provided between the raised tooth plate 39 and the teeth 34 and 36. The washer 51 enables the push rod 42 to slide in and out of it, thereby creating a locking function. In addition, the washer 51 will keep the push rod 42 in complete alignment within the joint 31 so when either side of the lock button 41 is pushed, it will cause the joint to lock or unlock.

Figure 15A:
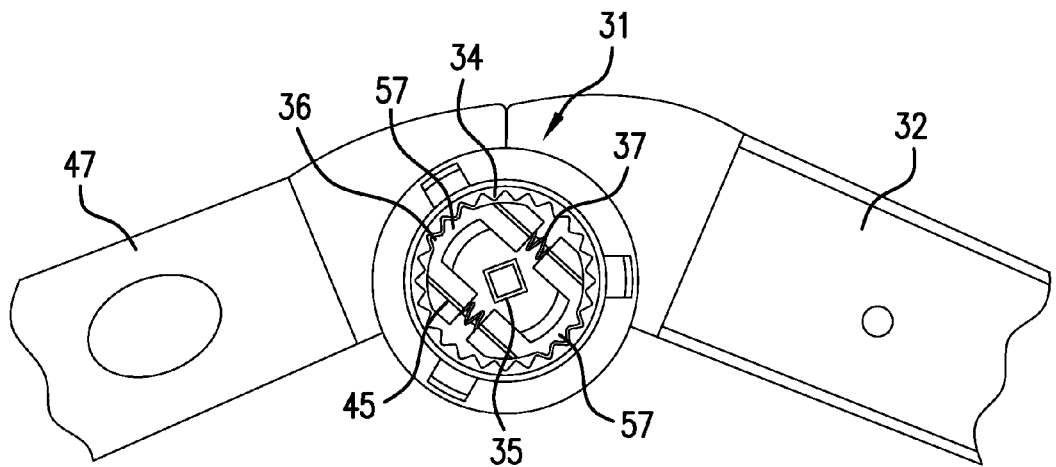
FIGS. 15A and 15B illustrate the operation of the joint of the backshaver of FIG. 9.
Figure 15B:
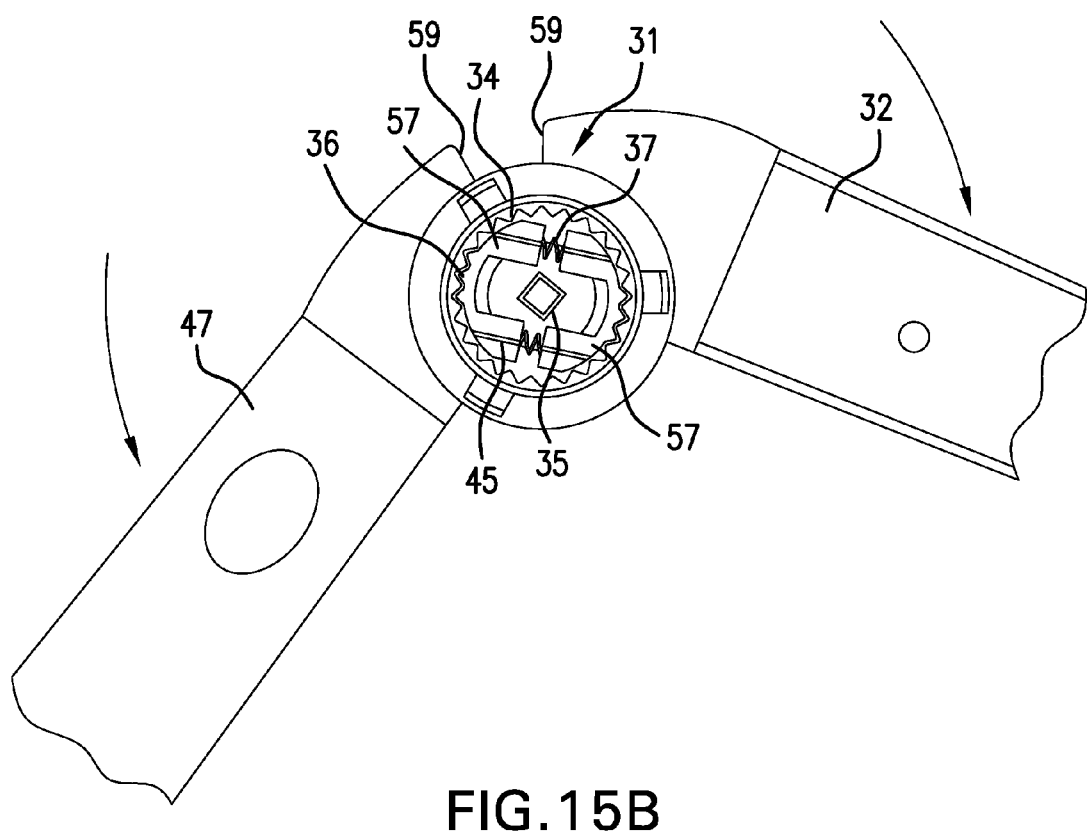

The joint 31 works based on the following basic principles. First, as the inner teeth 34 and the raised teeth 36 rotate with respect to each other, the relative rotation of the first handle portion 32 and the second handle portion 33 is a click-type rotation which provides a lock-step, so that a continuous rotation (i.e., with no lock step) is avoided. This allows the user to accurately select the desired angle between the handle portions 32 and 33. Second, the raised tooth plate 39 and the inner limiting teeth 38 are configured so that the raised tooth plate 39 can move up and down through actuation of the ON switch and the OFF switch 44; as a result, the raised tooth plate 39 can enter into or be separated from the inner limiting teeth 38, thereby limiting the relative rotation between the first handle portion 32 and the second handle portion 33. This allows the joint to be locked at the desired angle. FIG. 15A shows the two handle portions 32 and 33 oriented at a maximum angle of about 135 degrees, with the two ends 59 of the handle portions 32, 33 acting as stop members to prevent the handle portions 32, 33 from being pivoted beyond that maximum angle.

In addition, the movable handle 47 is sleeved outside the second handle portion 33, so that the length of the second handle portion 33 can be adjusted.

While the description above refers to particular embodiments of the present invention, it will be understood that many modifications may be made without departing from the spirit thereof.

What is claimed is:

1. A backshaver, comprising:
a first handle portion having a first end and a second end, with a shaver head carried at the first end;
a second handle portion;
a joint assembly comprising:
a housing having a first joint housing connected to the first handle portion and a second joint housing connected to the second handle portion, the first and second joint housings pivotable with respect to each other;
a first circle of inner teeth arranged inside the first joint housing;
two blocks retained inside the first joint housing, each block having one group of raised teeth that is adapted to be meshed inside certain teeth of the first circle of inner teeth;
a biasing element arranged between the blocks and biasing the blocks away from each other to push the groups of raised teeth against the certain teeth of the first circle of inner teeth;
a second circle of inner teeth arranged on an opposite side of the first circle of inner teeth;
a raised tooth plate provided inside the second circle of inner teeth, the raised tooth plate having at least two groups of teeth along its periphery, the raised tooth plate movable up and down with respect to the second circle of inner teeth to first and second positions, respectively, the at least two groups of teeth of the raised tooth plate being meshed with certain teeth of the second circle of inner teeth in the first position, and the at least two groups of teeth of the raised tooth plate being separated from the teeth of the second circle of inner teeth in the second position; and
a driving block that is secured to the raised tooth plate, the driving block moving the raised tooth plate up and down with respect to the second circle of inner teeth.

2. The backshaver of claim 1, wherein the joint assembly further includes a control switch coupled to the driving block which causes the driving block to move up and down.

3. The backshaver of claim 1, wherein the joint assembly is locked when the at least two groups of teeth of the raised tooth plate are meshed with certain teeth of the second circle of inner teeth in the first position.

* * * * *